United States Patent
Wu et al.

(10) Patent No.: US 9,220,346 B1
(45) Date of Patent: Dec. 29, 2015

(54) PEDAL-RING TIGHTENING STRUCTURE

(71) Applicants: Yen-Feng Wu, Tainan (TW); Chiu-Yen Lee, Tainan (TW)

(72) Inventors: Yen-Feng Wu, Tainan (TW); Chiu-Yen Lee, Tainan (TW)

(73) Assignees: Yen-Feng Wu, Tainan (TW); Chiu-Yen Lee, Tainan (TW)

( * ) Notice: Subject to any disclaimer, the term of this patent is extended or adjusted under 35 U.S.C. 154(b) by 0 days.

(21) Appl. No.: 14/501,313

(22) Filed: Sep. 30, 2014

(51) Int. Cl.
*A47C 7/50* (2006.01)
*F16B 2/06* (2006.01)

(52) U.S. Cl.
CPC .. *A47C 7/506* (2013.01); *F16B 2/06* (2013.01)

(58) Field of Classification Search
CPC .......... A47C 7/004; A47C 7/506; A47C 7/52; F16B 2/06; F16B 2/12; F16B 2/14
See application file for complete search history.

(56) References Cited

U.S. PATENT DOCUMENTS

| | | | | |
|---|---|---|---|---|
| 6,520,192 B1* | 2/2003 | Lo | ........................... | A45B 19/04 135/114 |
| 6,578,804 B2* | 6/2003 | Lin | ......................... | A47C 7/004 248/188.1 |
| 6,695,407 B1* | 2/2004 | Lin | ........................... | A47C 1/02 248/161 |
| 7,229,054 B2* | 6/2007 | Hu | ......................... | A47C 7/004 248/188.1 |
| 7,387,343 B1* | 6/2008 | Hsieh | ..................... | A47C 7/004 248/230.2 |
| 8,991,928 B2* | 3/2015 | Hsieh | ..................... | A47C 7/506 297/344.19 |
| 9,144,315 B1* | 9/2015 | Cheng | ..................... | A47C 7/004 |
| 2003/0151291 A1* | 8/2003 | Lin | ......................... | A47C 7/506 297/423.38 |

* cited by examiner

*Primary Examiner* — Philip Gabler
(74) *Attorney, Agent, or Firm* — Alan D. Kamrath; Kamrath IP Lawfirm, P.A.

(57) ABSTRACT

A pedal-ring tightening structure includes a pedal ring coupled to a supporting central tube of a seat at a predetermined height. At least two clamping elements are coupled to the periphery of the central tube at a predetermined height, such that a sleeve disposed centrally at the pedal ring formed peripherally and integrally with a predetermined width is coupled to the periphery of the clamping elements. A protruding portion extending from an inner rim of a fixing ring is inserted into a space concavely disposed at the upper end of each said clamping element to abut against precisely and press inward each said clamping element coupled to the periphery of the central tube, such that the pedal ring is steadily clamped and positioned at the central tube upon assembly.

8 Claims, 9 Drawing Sheets

PEDAL-RING TIGHTENING STRUCTURE

BACKGROUND OF THE INVENTION

1. Technical Field

The present invention provides a pedal-ring tightening structure which comprises a pedal ring coupled to a supporting central tube of a seat at a predetermined height. At least two clamping elements are coupled to the periphery of the central tube at a predetermined height, such that a sleeve disposed centrally at the pedal ring formed peripherally and integrally with a predetermined width is coupled to the periphery of the clamping elements. A protruding portion extending from an inner rim of a fixing ring is inserted into a space concavely disposed at the upper end of each said clamping element to abut against precisely and press inward each said clamping element coupled to the periphery of the central tube, such that the pedal ring is steadily clamped and positioned at the central tube upon assembly.

2. Description of Related Art

To allow the sitter of a conventional seat to rest his or her feet at a relatively high level, a pedal ring is coupled to the periphery of a supporting central tube of the conventional seat, so that the sitter can rest his or her feet on the pedal ring comfortably. The pedal ring coupled to the periphery of the supporting central tube of the conventional seat comes in a wide variety of forms for users to select as needed.

Figure 1:
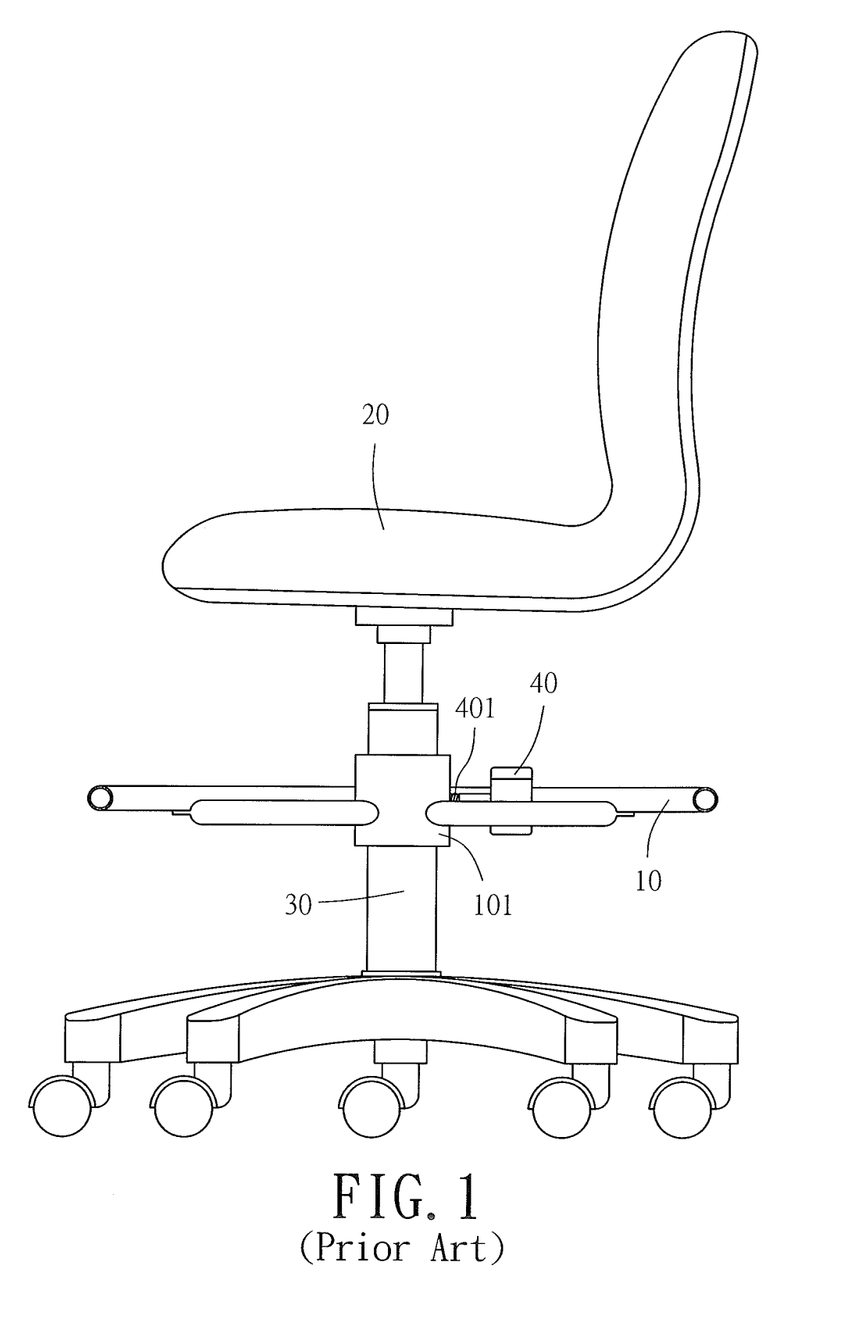
FIG. 1 (PRIOR ART) is a side view of a conventional means of tightening a pedal ring.

Referring to FIG. 1, there is shown a conventional pedal ring 10 of a seat. The pedal ring 10 is made of an appropriate material and formed integrally with the periphery of a sleeve 101. The sleeve 101 coupled to the pedal ring 10 fits around a supporting central tube 30 of a seat 20. A knob 40 with a thread 401 extending from an end of the knob 40 is provided. The thread 401 of the knob 40 corresponds in position to a predefined hole of the sleeve 101. The thread 401 of the knob 40 meshes with the hole of the sleeve 101 to enable the sleeve 101 to precisely press on and abut against the supporting central tube 30 of the seat 20, such that the pedal ring 10 is precisely and firmly coupled to the supporting central tube 30 of the seat 20 at a predetermined height, thereby allowing the user to rest his or her feet on the pedal ring 10 conveniently and comfortably.

Although users rest their feet on the pedal ring 10 comfortably, the single said thread 401 is likely to slide downward when trodden. Moreover, the pedal ring 10 can be tightened and positioned as expected only when the knob 40 is turned and tightened sufficiently.

BRIEF SUMMARY OF THE INVENTION

In view of the aforesaid drawbacks of the prior art, the present invention provides an improved pedal ring on which sitters of a seat rest their feet at a relatively high level. The improved pedal ring is coupled to a supporting central tube of the seat. At least two clamping elements are coupled to the periphery of the central tube circumferentially, such that during a positioning process the pedal ring fitted around the central tube is tightened precisely and firmly, thereby allowing the sitter's feet to rest on the pedal ring.

The present invention provides an improved pedal-ring tightening structure which comprises a pedal ring coupled to a supporting central tube of a seat at a predetermined height. At least two clamping elements are coupled to the periphery of the central tube at a predetermined height, such that a sleeve disposed centrally at the pedal ring formed peripherally and integrally with a predetermined width is coupled to the periphery of the clamping elements. A protruding portion extending from an inner rim of a fixing ring is inserted into a space concavely disposed at the upper end of each said clamping element to abut against precisely and press inward each said clamping element coupled td the periphery of the central tube, such that the pedal ring is steadily clamped and positioned at the central tube upon assembly.

It is an objective of the present invention to provide a pedal-ring tightening structure comprising a pedal ring coupled to a supporting central tube of a seat, effectuating precise pressing and positioning, and characterized in that: a clamping unit is coupled to the periphery of the supporting central tube at a predetermined height; the clamping unit comprises at least two clamping elements, a fixing ring, and the pedal ring formed peripherally and integrally with a predetermined width; the clamping elements each taper upward; a lower portion of each said clamping element extends to form a groove-containing engaging portion at a predetermined height to insert the groove-containing engaging portion into a slot penetrating a sleeve disposed centrally at the pedal ring; protruding partition-baffle portions are disposed at an upper portion of each said clamping element, and a space is concavely disposed between the partition-baffle portions, wherein a protruding portion extending from an inner rim of the fixing ring is inserted into the space disposed at the upper end of each said clamping element to abut against precisely and press inward each said clamping element coupled to a periphery of the central tube, such that the pedal ring is steadily clamped and positioned at the central tube upon assembly.

Another objective of the present invention is to provide a pedal-ring tightening structure comprising a pedal ring coupled to a supporting central tube of a seat, effectuating precise pressing and positioning, and characterized in that: a clamping unit is coupled to a periphery of the supporting central tube at a predetermined height; the clamping unit comprises at least two clamping elements, at least two bushings, a fixing ring, and the pedal ring formed peripherally and integrally with a predetermined width; each said clamping element tapers upward; a hole is disposed at the top and bottom of each of the clamping elements; the protruding portion extending from a corresponding portion of the outer side of each soft tough bushing is inserted into the hole of each said clamping element; a lower portion of each clamping element extends to form a groove-containing engaging portion at a predetermined height to insert the groove-containing engaging portion into a slot penetrating a sleeve disposed centrally at the pedal ring; protruding partition-baffle portions are disposed at an upper portion of each said clamping element, and a space is concavely disposed between the partition-baffle portions, wherein a protruding portion extending from an inner rim of a fixing ring is inserted into a space concavely disposed at the upper end of each said clamping element to abut against precisely and press inward each said clamping element coupled to the periphery of the central tube and the bushing adjacent to the clamping element, such that the pedal ring is steadily clamped and positioned at the central tube upon assembly.

Yet another objective of the present invention is that a clamping unit coupled to the periphery of a supporting central tube at a predetermined height is characterized in that: a tension spring constantly pushing outward is disposed between an upper rim of the sleeve disposed centrally at the pedal ring and a lower end of the fixing ring disposed at an upper end of each said clamping element, such that the fixing ring inserted into the space at the upper end of each said clamping element can press well when pushed upward, and each said clamping element is driven to press and abut inward, thereby effectuating precise tightening between the supporting central tube and the components and/or bushings positioned proximate thereto.

A further objective of the present invention is that a clamping unit coupled to the periphery of a supporting central tube at a predetermined height is characterized in that: an upper portion of the fixing ring disposed at an upper end of each said clamping element is covered with a cover having centrally a hole to prevent ambient dust from intruding into a gap of the supporting central tube and the clamping unit.

A further objective of the present invention is that a clamping unit coupled to the periphery of a supporting central tube at a predetermined height is characterized in that: a flange is formed at the inner rim of each clamping element having an upper end into which a fixing ring is inserted, so as to press on and abut against the supporting central tube or after the soft tough bushings have been disposed therein.

DETAILED DESCRIPTION OF THE INVENTION

Figure 2:
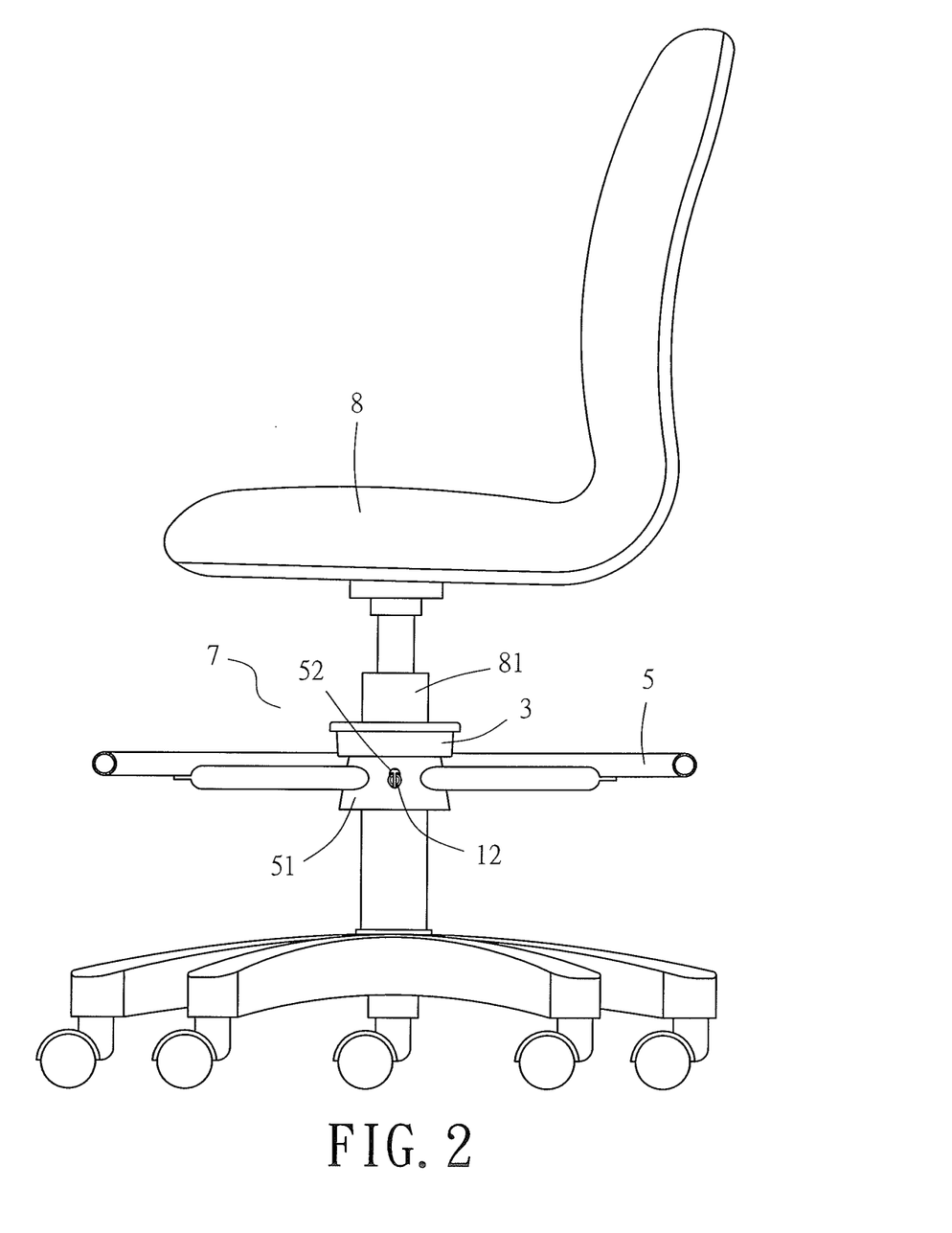
FIG. 2 is a side view of a pedal-ring tightening structure of the present invention.
Figure 3:
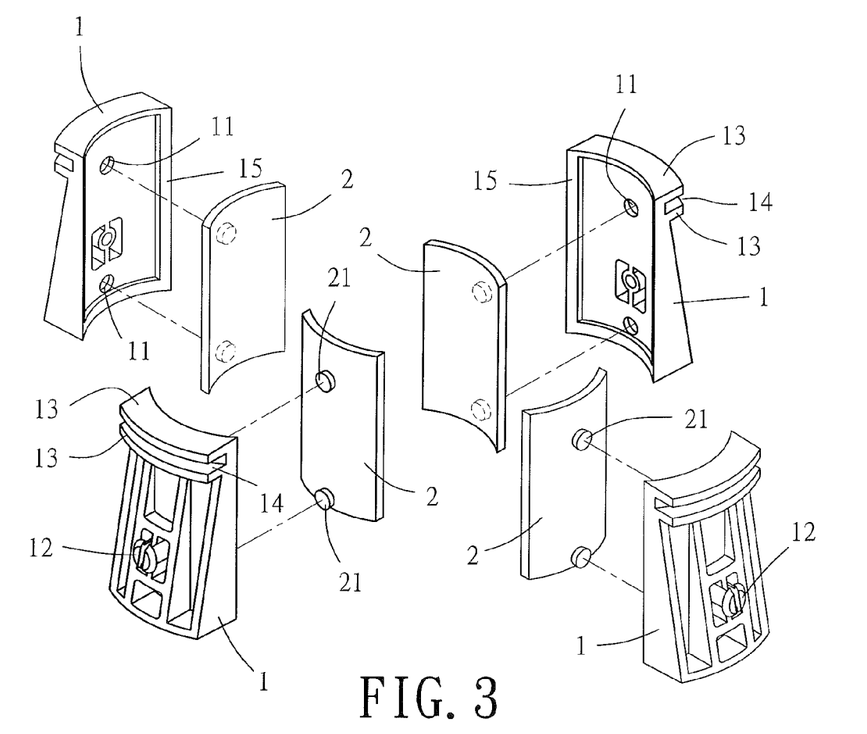
FIG. 3 is an exploded view of a clamping unit of the pedal-ring tightening structure of the present invention.
Figure 4:
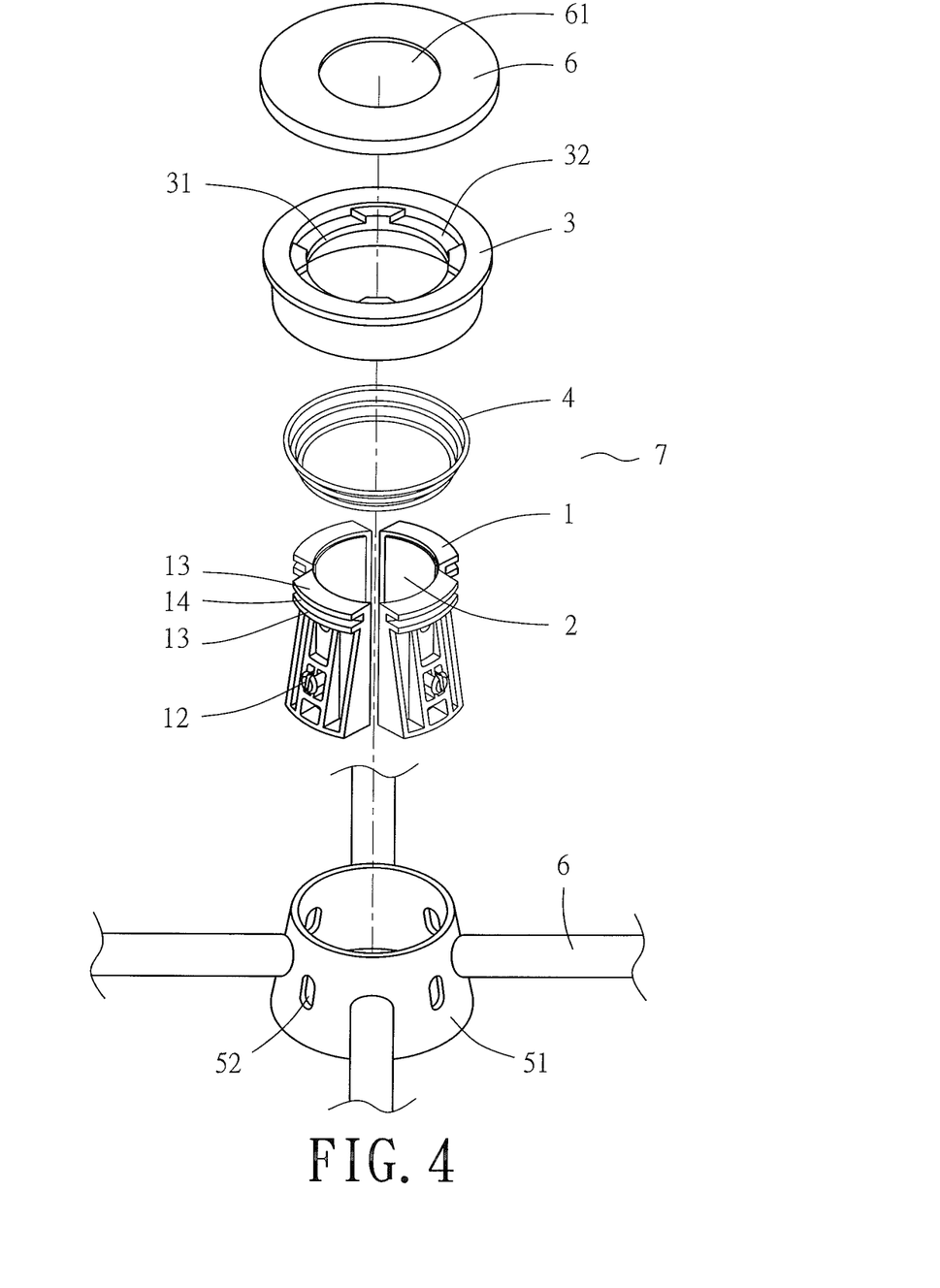
FIG. 4 is an exploded view of the clamping unit of the pedal-ring tightening structure of the present invention.

Referring to FIG. 2, a pedal-ring tightening structure of the present invention comprises a pedal ring 5 disposed at a supporting central tube 81 of a seat 8 and adapted to be precisely pressed and positioned. A clamping unit 7 is coupled to the periphery of the supporting central tube 81 and at a predetermined height. The clamping unit 7 comprises at least two clamping elements 1, at least two bushings 2, a fixing ring 3, a tension spring 4, the pedal ring 5 formed peripherally and integrally with a predetermined width, and a cover 6, as shown in FIG. 3 and FIG. 4.

The at least two clamping elements 1 are each a covering component whose appropriate curvature and depth are determined according to the outer diameter of the supporting central tube 81. The clamping elements 1 each taper upward. A hole 11 is disposed at the top and bottom of each of the clamping elements 1 to penetrate each of the clamping elements 1. A lower portion of each clamping element 1 extends to form a groove-containing engaging portion 12 at a predetermined height. Protruding partition-baffle portions 13 are disposed at an upper portion of each clamping element 1, and a space 14 is concavely disposed between the partition-baffle portions 13. A flange 15 is formed at the inner rim of each clamping element 1 (so as to press on and abut against the supporting central tube 81 or after the soft tough bushings 2 have been disposed therein.)

The at least two bushings 2 are anti-skid components designed according to the shape of the clamping elements 1 and the supporting central tube 81. A protruding portion 21 extends from predetermined upper and lower portions on the outer sides of the soft tough bushings 2

The fixing ring 3 is an inward-limiting component designed according to the shape of the upper end of each clamping element 1. A protruding portion 31 extends from the inward side of the fixing ring 3. A plurality of dent areas 32 is defined at the upper end of the fixing ring 3 and positioned proximate to the protruding portion 31.

The tension spring 4 is a downward-tapering abutting component designed according to the fixing ring 3 and the sleeve 51 disposed centrally at the pedal ring 5.

The pedal ring 5, which is formed peripherally and integrally with a predetermined width, is a pedal component designed in accordance with the seat 8. A sleeve 51 is disposed centrally at the pedal ring 5. A plurality of spaced-apart slots 52 is disposed at the sleeve 51 to penetrate the sleeve 51 at a predetermined height.

Figure 6:
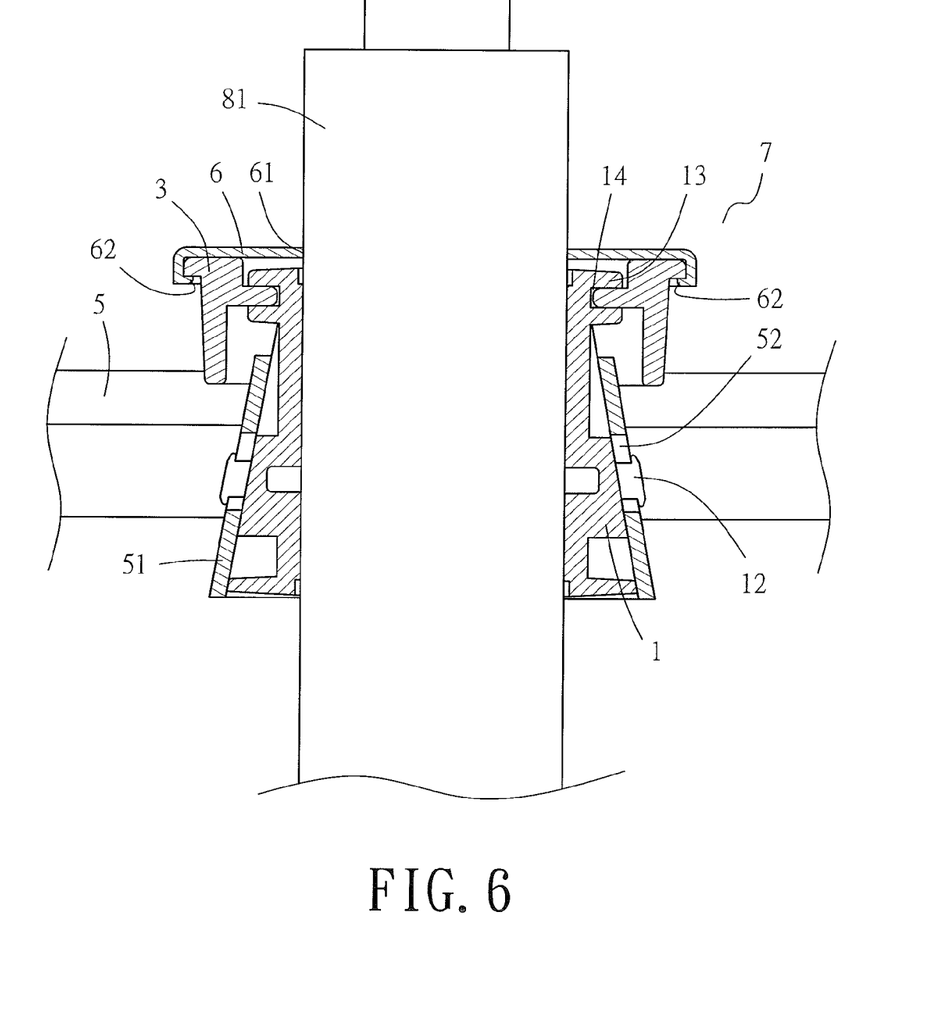
FIG. 6 is a cross-sectional view of the clamping unit and the central tube of the seat which are tightened together according to an embodiment of the present invention.

The cover 6 is a shielding component designed according to the upper rim of the fixing ring 3. A hole 61 is formed centrally at the cover 6. An inward-abutting segment 62 (shown in FIG. 6) extends downward from the rim of the cover 6 and covers the upper portion of the fixing ring 3 to prevent ambient dust from intruding into a gap of the supporting central tube 81 and the clamping unit 7.

The processing of putting together the at least two clamping elements 1, the fixing ring 3, the tension spring 4, the pedal ring 5 formed peripherally and integrally with a predetermined width, and the cover 6 in the first embodiment (illustrated with FIG. 3, FIG. 4, FIG. 6) to form the clamping unit 7 comprises the steps as follows: the first step: inserting each clamping element 1 into the sleeve 51 disposed centrally at the pedal ring 5, and inserting the groove-containing engaging portion 12 of each clamping element 1 into the slot 52 (shown in FIG. 6) penetrating the sleeve 51 disposed centrally at the pedal ring 5; the second step: abutting the tension spring 4 against the upper rim of the sleeve 51 disposed centrally at the pedal ring 5, and inserting the protruding portion 31 extending from the inward side of the fixing ring 3 into the space 14 coupled to the upper end of each clamping element 1 disposed in the sleeve 51, wherein the partition-baffle portions 13 disposed at an upper portion of each clamping element 1 are disposed at the dent areas 32 defined at the upper end of the fixing ring 3, and the upper end of the tension spring 4 abuts against the lower portion of the fixing ring 3; the third step: covering the fixing ring 3 with the cover 6, wherein the inward-abutting segment 62 extending downward from the rim of the cover 6 gets engaged with the corresponding rim of the fixing ring 3, so as to form the clamping unit 7; the fourth step: pressing down the fixing ring 3 and the cover 6 of the clamping unit 7 to allow the fixing ring 3 to stretch outward slightly, and driving each clamping element 1 to be temporarily stretchable in inner diameter to therefore fit the clamping unit 7 around the supporting central tube 81 and then immediately release the cover 6 and the fixing ring 3, such that the tension spring 4 pushes the fixing ring 3 upward. The protruding portion 31 extending from an inner rim of the fixing ring 3 abuts against precisely and presses inward each the clamping element 1 so as to press and tighten the supporting central tube 81 from outside, such that the pedal ring 5 is steadily clamped and positioned at the central tube 81 upon assembly.

Figure 5:
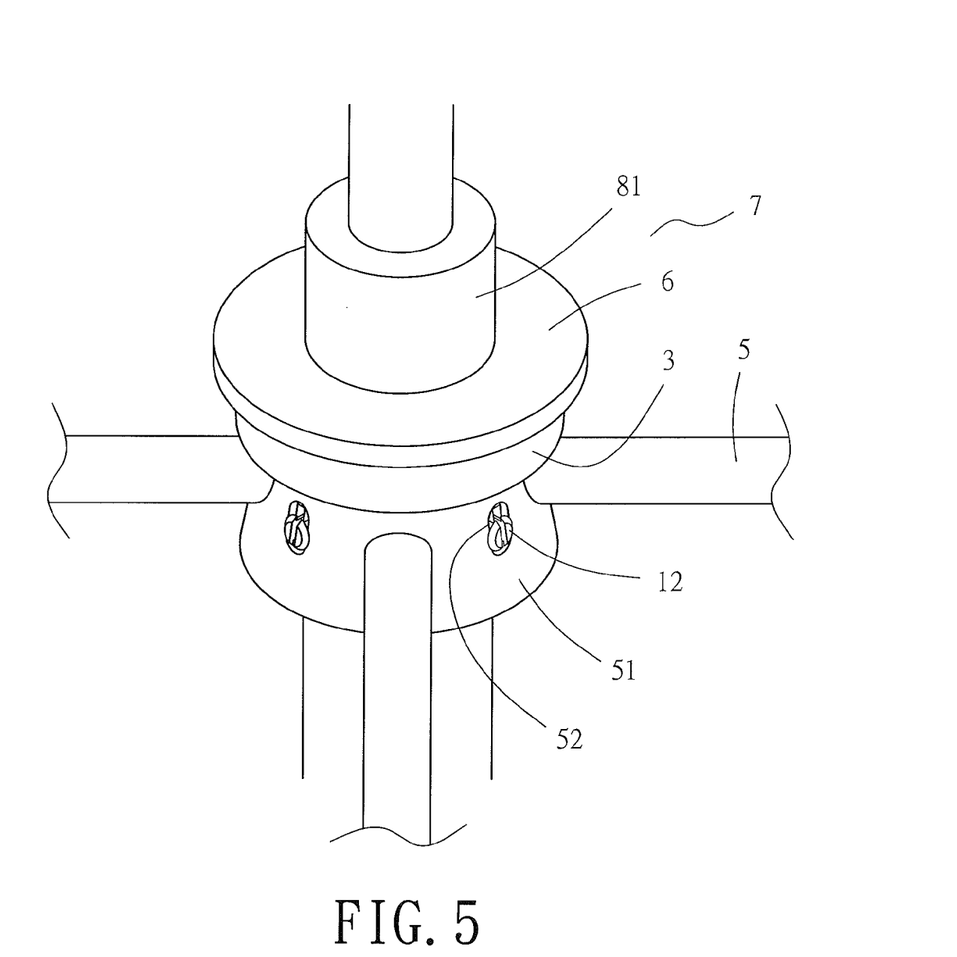
FIG. 5 is a perspective view of the clamping unit and a central tube of a seat according to the present invention.
Figure 7:
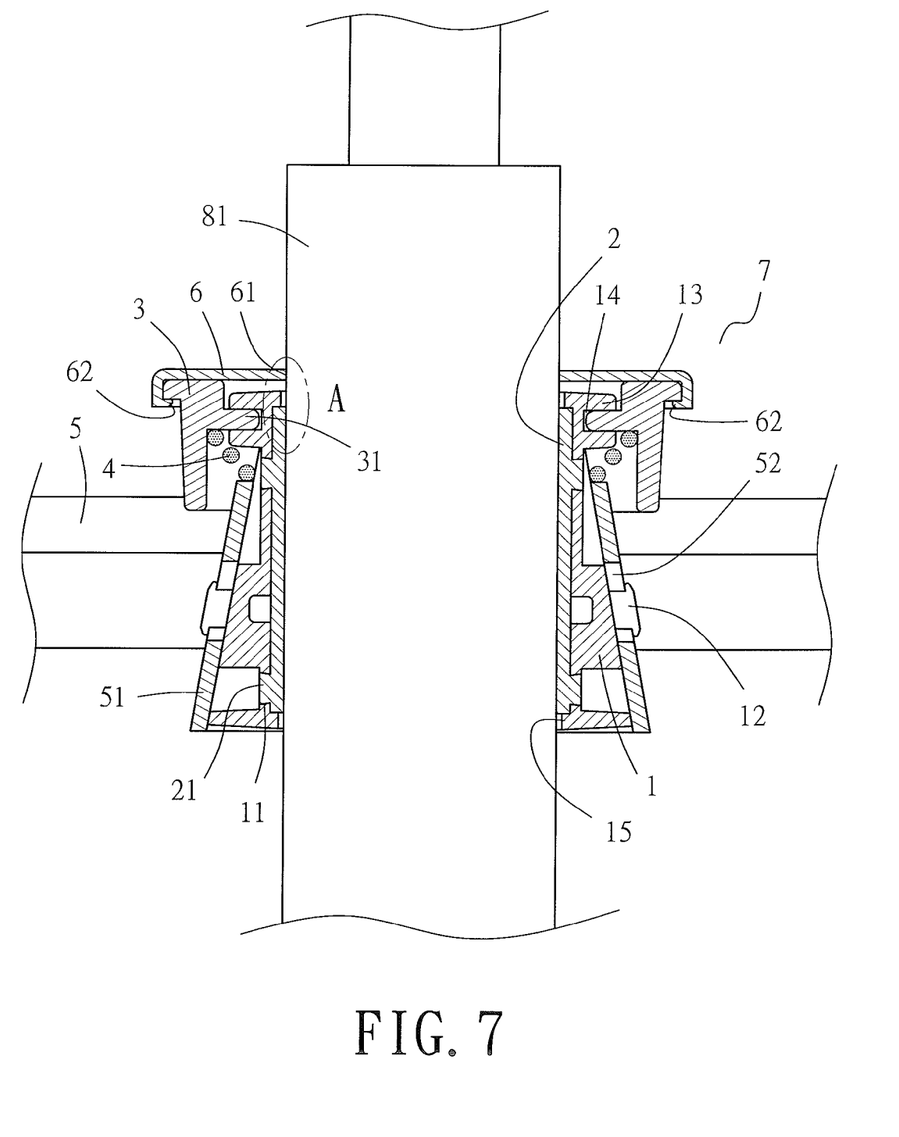
FIG. 7 is a cross-sectional view of the clamping unit and the central tube of the seat which are tightened together according to another embodiment of the present invention.
Figure 7A:
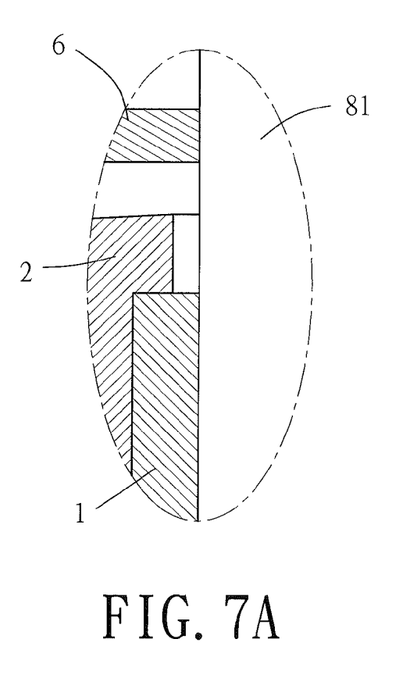
FIG. 7A is an enlarged view of portion A shown in FIG. 7.

The processing of putting together the at least two clamping elements 1, the at least two bushings 2, the fixing ring 3, the tension spring 4, the pedal ring 5 formed peripherally and integrally with a predetermined width, and the cover 6 in the second embodiment (illustrated with FIG. 3, FIG. 4, FIG. 7) to form the clamping unit 7 comprises the steps as follows: the first step: inserting each protruding portion 21 extending from upper and lower portions on the outer side of each bushing 2 into the hole 11 of each clamping element 1 so as to form a plurality of clamping components (as shown in FIG. 4); the second step: inserting each clamping element 1 inwardly coupled to the bushing 2 into the sleeve 51 disposed centrally at the pedal ring 5, and inserting the groove-containing engaging portion 12 of each clamping element 1 into the slot 52 (shown in FIG. 7) penetrating the sleeve 51 disposed centrally at the pedal ring 5; the third step: abutting the tension spring 4 against the upper rim of the sleeve 51 disposed centrally at the pedal ring 5, and inserting the protruding portion 31 extending from the inward side of the fixing ring 3 into the space 14 coupled to the upper end of each clamping element 1 disposed in the sleeve 51, wherein the partition-baffle portions 13 disposed at an upper portion of each clamping element 1 are disposed at the dent areas 32 defined at the upper end of the fixing ring 3, and the upper end of the tension spring 4 abuts against the lower portion of the fixing ring 3; the fourth step: covering the fixing ring 3 with the cover 6, wherein the inward-abutting segment 62 extending downward from the rim of the cover 6 gets engaged with the corresponding rim of the fixing ring 3, so as to form the clamping unit 7; the fifth step: pressing down the fixing ring 3 and the cover 6 of the clamping unit 7 to allow the fixing ring 3 to stretch outward slightly, and driving each clamping element 1 and bushing 2 to be temporarily stretchable in inner diameter to therefore fit the clamping unit 7 around the supporting central tube 81 and then immediately release the cover 6 and the fixing ring 3, such that the tension spring 4 pushes the fixing ring 3 upward. The protruding portion 31 extending from an inner rim of the fixing ring 3 abuts against precisely and presses inward the clamping elements 1 and the bushings 2 (as shown in FIG. 7 and FIG. 7A) to press and tighten the supporting central tube 81 from outside (as shown in FIG. 5), such that the pedal ring 5 is steadily clamped and positioned at the central tube 81 upon assembly.

Figure 8:
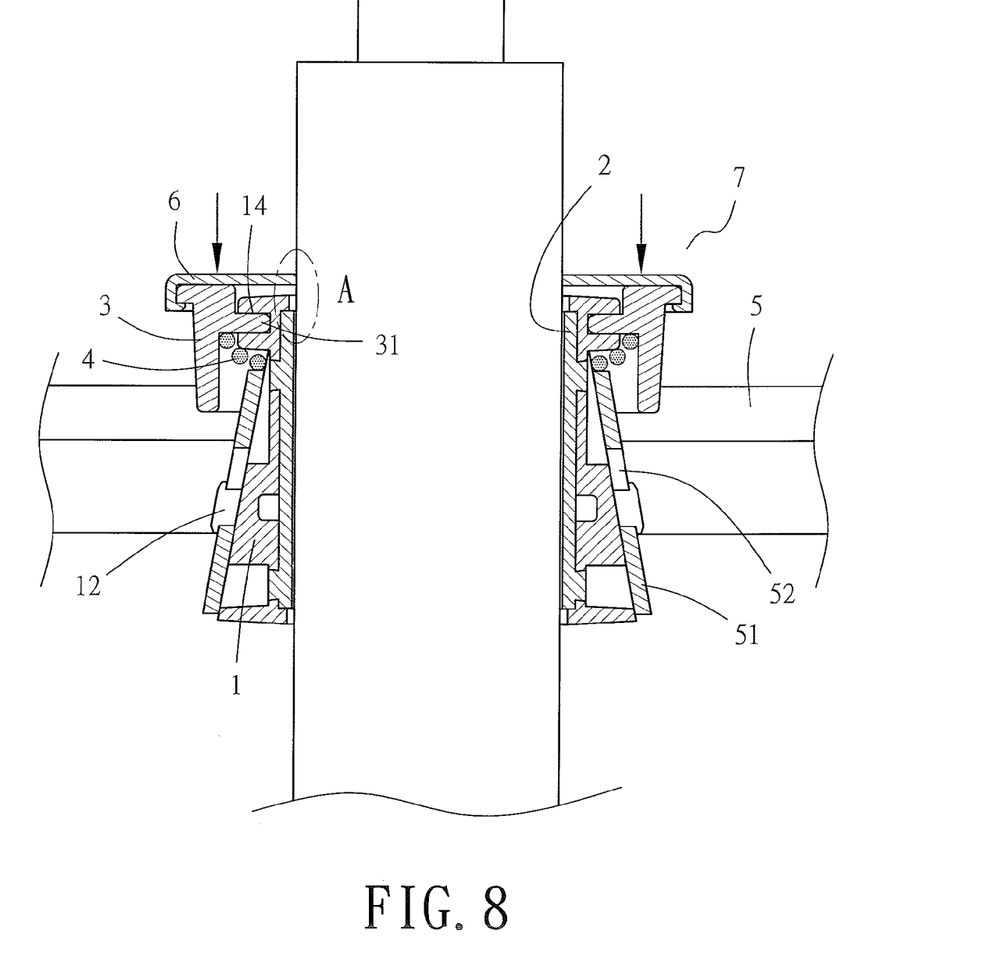
FIG. 8 is a schematic view of pressing down the clamping unit disposed adjustably at the central tube of the seat according to the present invention.
Figure 8A:
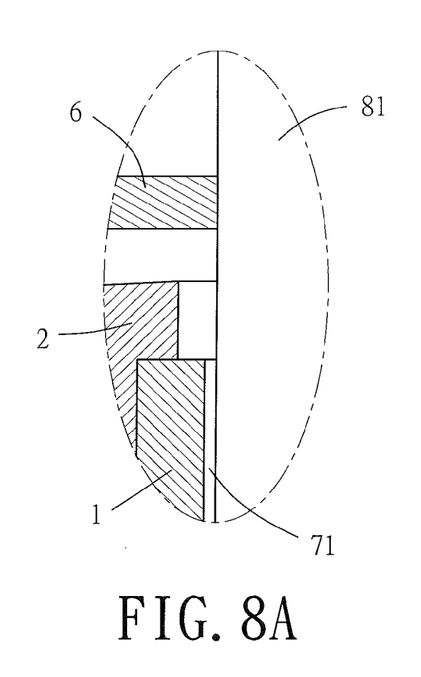
FIG. 8A is an enlarged view of portion A shown in FIG. 8.

Adjustment of the height of the pedal ring 5 coupled to the supporting central tube 81 (as shown in FIG. 8) merely entails pressing down the cover 6 and the fixing ring 3 of the clamping unit 7 to allow the fixing ring 3 to stretch outward slightly, and driving each clamping element 1 and the bushing 2 to be temporarily stretchable in inner diameter. At this point in time, the clamping unit 7 is in a free state and is spaced apart from the supporting central tube 81 by a gap 71 (as shown in FIG. 8A), and the user can adjust the height of the pedal ring 5 according to the user's expectation for comfort, and then release the cover 6 and the fixing ring 3 to therefore allow the fixing ring 3 to push upward, and in consequence the protruding portion 31 extending from an inner rim of the fixing ring 3 presses each clamping element 1 and the bushing 2 inward such that the clamping elements 1 and the bushing 2 abut against the periphery of the supporting central tube 81, thereby effectuating steady annular tightening and positioning (as shown in FIG. 7).

What is claimed is:

1. A pedal-ring tightening structure comprising a pedal ring coupled to a supporting central tube of a seat, wherein a clamping unit is coupled to a periphery of the supporting central tube at a predetermined height;

the clamping unit comprises at least two clamping elements, a fixing ring, and the pedal ring formed peripherally and integrally with a predetermined width; the clamping elements each taper upward; a lower portion of each said clamping element extends to form a groove-containing engaging portion at a predetermined height to insert the groove-containing engaging portion into a slot penetrating a sleeve disposed centrally at the pedal ring; protruding partition-baffle portions are disposed at an upper portion of each said clamping element, and a space is concavely disposed between the partition-baffle portions, wherein a protruding portion extending from an inner rim of the fixing ring is inserted into the space disposed at the upper end of each said clamping element to abut against and press inward each said clamping element coupled to a periphery of the central tube, such that the pedal ring is steadily clamped and positioned at the central tube upon assembly.

2. The pedal-ring tightening structure of claim 1, wherein a tension spring constantly pushing outward is disposed between an upper rim of the sleeve disposed centrally at the pedal ring and a lower end of the fixing ring disposed at an upper end of each said clamping element, such that the fixing ring inserted into the space at the upper end of each said clamping element can press when pushed upward, and each said clamping element is driven to press and abut inward, thereby effectuating precise tightening between the supporting central tube and components adjacent thereto.

3. The pedal-ring tightening structure of claim 1, wherein an upper portion of the fixing ring disposed at an upper end of each said clamping element is covered with a cover having centrally a hole to prevent dust from intruding into a gap of the supporting central tube and the clamping unit.

4. The pedal-ring tightening structure of claim 1, wherein a flange is formed at the inner rim of each clamping element having an upper end into which the fixing ring is inserted, so as to press on and abut against the supporting central tube.

5. A pedal-ring tightening structure comprising a pedal ring coupled to a supporting central tube of a seat, wherein a clamping unit is coupled to a periphery of the supporting central tube at a predetermined height, and the clamping unit comprises at least two clamping elements, at least two bushings, a fixing ring, and the pedal ring formed peripherally and integrally with a predetermined width; each said clamping element tapers upward; a hole is disposed at the top and bottom of each of the clamping elements; the protruding portion extending from a corresponding portion of the outer side of each bushing is inserted into the hole of each said clamping element; a lower portion of each clamping element extends to form a groove-containing engaging portion at a predetermined height to insert the groove-containing engaging portion of each clamping element into a slot penetrating the sleeve disposed centrally at the pedal ring; protruding partition-baffle portions are disposed at an upper portion of each said clamping element, and a space is concavely disposed between the partition-baffle portions, wherein a protruding portion extending from an inner rim of the fixing ring is inserted into the space disposed at the upper end of each said clamping element to abut against and press inward each said clamping element coupled to a periphery of the central tube and each said bushing adjacent to each said clamping element, such that the pedal ring is steadily clamped and positioned at the central tube upon assembly.

6. The pedal-ring tightening structure of claim 5, wherein a tension spring constantly pushing outward is disposed between an upper rim of the sleeve disposed centrally at the pedal ring and a lower end of the fixing ring disposed at an upper end of each said clamping element, such that the fixing ring inserted into the space at the upper end of each said clamping element can press when pushed upward, and each said clamping element is driven to press and abut inward, thereby effectuating precise tightening between the supporting central tube and the bushings positioned proximate thereto.

7. The pedal-ring tightening structure of claim 5, wherein an upper portion of the fixing ring disposed at an upper end of each said clamping element is covered with a cover having centrally a hole to prevent dust from intruding into a gap of the supporting central tube and the clamping unit.

8. The pedal-ring tightening structure of claim 5, wherein a flange is formed at the inner rim of each clamping element having an upper end into which the fixing ring is inserted, so as to press on and abut against the supporting central tube after the bushings have been disposed therein.

* * * * *